(12) United States Patent
Kanda

(10) Patent No.: US 6,798,585 B2
(45) Date of Patent: Sep. 28, 2004

(54) REFERENCE LENS FOR INTERFEROMETER AND INTERFEROMETER THAT USES IT

(75) Inventor: Hideo Kanda, Saitama (JP)

(73) Assignee: Fuji Photo Optical Co., Ltd., Saitama (JP)

(*) Notice: Subject to any disclaimer, the term of this patent is extended or adjusted under 35 U.S.C. 154(b) by 102 days.

(21) Appl. No.: 10/347,319

(22) Filed: Jan. 21, 2003

(65) Prior Publication Data

US 2003/0147152 A1 Aug. 7, 2003

(30) Foreign Application Priority Data

Feb. 6, 2002 (JP) ........................................ 2002-029195

(51) Int. Cl.$^7$ .............................. G02B 9/34; G02B 9/60
(52) U.S. Cl. ...................................... 359/761; 359/770
(58) Field of Search .................................. 359/761, 770

(56) References Cited

U.S. PATENT DOCUMENTS 4,074,937 A * 2/1978 Zanoni ..................... 356/513
4,758,089 A * 7/1988 Yokokura et al. ........... 356/458
5,004,346 A * 4/1991 Kuchel ...................... 356/513

FOREIGN PATENT DOCUMENTS

JP 05332715 A * 12/1993 ............ G01B/9/02
JP 2000-346613 12/2000

* cited by examiner

Primary Examiner—Scott J. Sugarman
(74) Attorney, Agent, or Firm—Arnold International; Jon W. Henry; Bruce Y. Arnold

(57) ABSTRACT

A reference lens for an interferometer is constructed so that light transmitted by a partially reflecting reference spherical surface may be converged, toward a focal point that coincides with the center of curvature of the reference spherical surface, and reflected from a subject spherical surface that also has its center of curvature at the focal point. Measurement of the shape of the subject spherical surface is possible based on the interference of two light beams, one reflected by the subject spherical surface and one reflected by the reference spherical surface. The reference lens, which may include five or six lens components or lens elements, includes a negative meniscus lens component, a positive lens group, and a positive lens component. Specified conditions are satisfied to provide a reference lens that has favorable correction of aberrations, is compact, and can measure the surface accuracy of a wide range of convex spherical surfaces.

20 Claims, 4 Drawing Sheets

Spherical Aberration

Spherical Aberration

Spherical Aberration

REFERENCE LENS FOR INTERFEROMETER AND INTERFEROMETER THAT USES IT

BACKGROUND OF THE INVENTION

An interferometer is often used to measure the surface accuracy of optical components, such as optical lenses or mirrors. In particular, a Fizeau interferometer, which is equipped with a reference lens that is normally manufactured with a high degree of accuracy, is widely used as an interferometer because it has a simple structure, a comparatively wide field of view, and can measure a surface shape with high accuracy.

With a Fizeau interferometer, the measurement of a spherical surface (hereinafter referred to as a "subject spherical surface"), such as a lens surface, is performed as follows. First, a parallel incident luminous flux defining a collimated light beam with a planar wavefront is converged by a reference lens into a spherical light wave. Then, the spherical light wave strikes a subject spherical surface. The optical arrangement is designed so that directions normal to the spherical light wave (that define the directions of convergence of the spherical surface light wave) coincide with the directions normal to the subject spherical surface. This results in the light being reflected backwards in directions exactly opposite to its directions of incidence onto the subject spherical surface. This light is hereinafter referred to as the "subject light", and it then passes once more through the reference lens. However, not all the light that enters the reference lens which is directed toward the subject spherical surface actually reaches the subject spherical surface. A portion of the incident light beam (hereinafter referred to as the "reference light") is reflected from the spherical lens surface of the reference lens that is nearest the subject spherical surface (hereinafter referred to as a "reference spherical surface") and passes back through the reference lens. The subject light and the reference light interfere to create interference fringes. Observation of these interference fringes enables the measurement of the shape of the subject spherical surface.

With this Fizeau interferometer, in order to fully measure the subject spherical surface that has an acceptance angle θ1 (the angle that the outer edge portions of the subject spherical surface make with the center of curvature of the subject spherical surface), it is necessary that the light beam with the spherical wavefront be converged by a collection angle θ2 that is larger than the acceptance angle θ1. In other words, it is necessary to satisfy the relationship: θ2>θ1. A more detailed explanation is as follows. The relationship between the collection angle θ2 and the numerical aperture NA of the reference lens at the light incident side of the subject spherical surface is expressed as follows:

$$NA = \sin(\theta 2/2).$$

On the other hand, the maximum diameter B of a subject spherical surface about the optical axis, the radius of curvature C of the subject spherical surface, and the acceptance angle θ1, are related as follows for full measurement of the subject spherical surface:

$$B/(2C) = \sin(\theta 1/2).$$

Additionally, in order to satisfy the relationship θ2>θ1, it follows that:

$$\sin(\theta 2/2) > \sin(\theta 1/2).$$

Consequently, in order to fully measure the subject spherical surface, a relatively large numerical aperture (i.e., a relatively small F-number) reference lens that satisfies the following inequality is required:

$$2NA > B/C.$$

However, because of limitations on the size of the light beam diameter that enters into the reference lens, the following problems exist. If the lens components of the reference lens are all convex lens components and the incident light beam is converged by all these convex lens components, then every time refraction occurs at each lens component, the radius of curvature of the incident light beam wavefront, along with the light beam diameter, is gradually reduced, so that the radius of curvature of the light beam wavefront and the light beam diameter at the reference spherical surface becomes small.

If the subject spherical surface is a convex surface, the measurable subject spherical surface is limited to one where the radius of curvature is less than the radius of curvature of the reference spherical surface and where the diameter about the optical axis of the subject spherical surface is less than the diameter about the optical axis of the lens component that includes the reference spherical surface. Consequently, if the radius of curvature of the light beam wavefront and the diameter of the light beam emitted from the reference spherical surface are small, the shape and size of the subject spherical surface is so limited that it is difficult, if not impossible, to measure a subject spherical surface having a large radius of curvature and a large maximum diameter about the optical axis. Additionally, if as discussed above, the reference lens contains only lens components having positive refractive power, it is difficult to eliminate spherical aberration from the light image formed by interference.

In order to solve these problems, Japanese Laid-Open Patent Application 2000-346613 discloses a reference lens with a numerical aperture NA at the side of the subject spherical surface that is sufficiently large (NA=0.806) that, even if the subject spherical surface is a convex surface that has a large acceptance angle, it is possible to measure the surface accuracy of the entire subject spherical surface with a high degree of accuracy. However, the reference lens disclosed in the above-mentioned application is made of seven lens elements and is very large, with a maximum diameter about the optical axis of 480 mm. Problems of producing such a large lens, including technical problems of production and very high costs of production, as well as problems of practically handling such a large lens, make this reference lens impractical because of its size and weight. Therefore, further improvement is desirable.

BRIEF SUMMARY OF THE INVENTION

The present invention relates to a reference lens for an interferometer with a large numerical aperture, having small aberrations (including small spherical aberrations), and with a reference spherical surface that has a relatively large radius of curvature and diameter about the optical axis, while still being light in weight and compact. These features enable highly accurate measurements to be obtained of the shape of a convex spherical surface having a large acceptance angle, a large radius of curvature, and a large diameter about the optical axis. The present invention relates specifically to a reference lens for a Fizeau interferometer which is suitable for highly accurate measurements of the shape of surfaces of optical components.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION OF THE INVENTION

First, definitions of the terms "lens element," lens component," and "lens group," that relate to the following detailed description will be given. The term "lens element" is herein defined as a single transparent mass of refractive material having two opposed refracting surfaces, which surfaces are disposed at least generally transverse to the optical axis of the reference lens. The term "lens component" is herein defined as (a) a single lens element spaced so far from any adjacent lens element that the spacing cannot be neglected in computing the optical image forming properties of the lens elements or (b) two or more lens elements that have their adjacent lens surfaces either in full overall contact or are so close together that the spacings between adjacent lens surfaces of the different lens elements are so small that the spacings can be neglected in computing the optical image forming properties of the two or more lens elements. Thus, some lens elements may also be lens components. Therefore, the terms "lens element" and "lens component" should not be taken as mutually exclusive terms. In fact, the terms may frequently be used to describe a single lens element in accordance with part (a) above of the definition of a "lens component."

The term "lens group" is herein defined as a group of one or more lens components in optical series along an optical axis and that, for known purposes of lens evaluation and lens design, may be considered equivalent to a single lens element. Known lens design and evaluation techniques determine whether a group of one or more lens components in optical series is properly considered a lens group. As more precise lens evaluation and lens design techniques are considered, a lens group that includes more than one lens component may be divided into further lens groups, and that process of division may proceed, in some cases, until a lens group that includes only one lens component is identified.

Additionally, as used herein, the term "negative" preceding a lens element, lens component, or lens group means that the lens element, lens component, or lens group (as a whole) has a negative refractive power. Similarly, as used herein, the term "positive" preceding a lens element, lens component, or lens group means that the lens element, lens component, or lens group (as a whole) has a positive refractive power.

Figure 1:
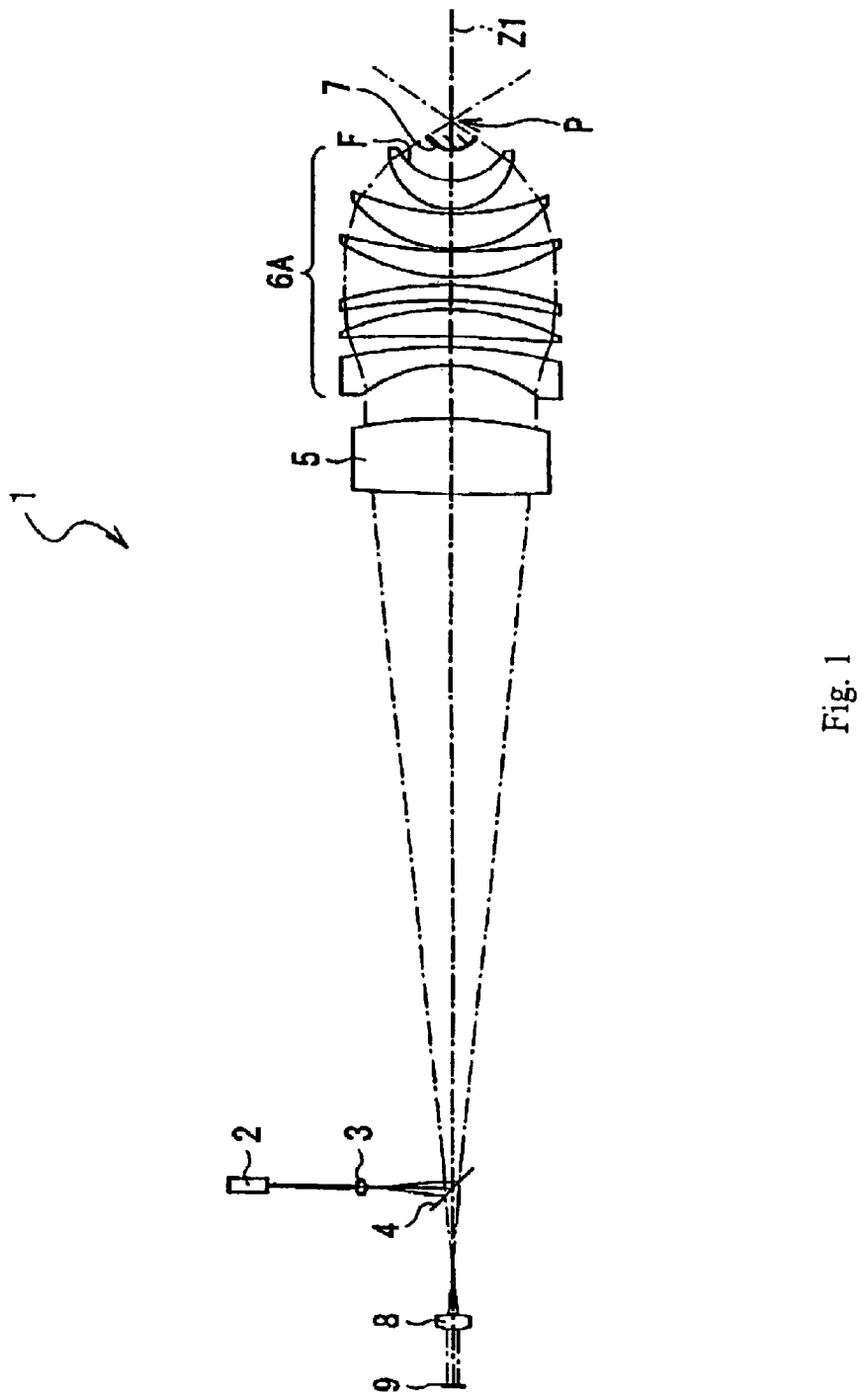
FIG. 1 is a cross-sectional view of a Fizeau interferometer using a reference lens according to Embodiment 1 of the present invention.

A general description of the reference lens of the present invention that pertains to all three embodiments of the invention will first be described with reference to FIG. 1 (that shows Embodiment 1). FIG. 1 shows a Fizeau interferometer 1 that uses a reference lens 6A of the present invention. The Fizeau interferometer 1 is equipped with a laser light source 2, a laser light beam radiation lens 3, a partially reflecting mirror 4, a collimator lens 5, a reference lens 6A, an imaging lens 8, and an image sensor 9. Along an optical axis Z1, the image sensor 9, the imaging lens 8, the partially reflecting mirror 4, the collimator lens 5, and the reference lens 6A are arranged at specified positions, in that order. On the other hand, the laser light beam radiation lens 3 and the laser light source 2 are arranged, in that order, along a line intersecting the optical axis Z1 at a right angle. The laser light beam radiation lens 3 enlarges the diameter of the laser light beam that is emitted from the laser light source 2. The partially reflecting mirror 4 is at a 45 degree angle with respect to the optical axis Z1, and it reflects a portion of the light beam and transmits the remaining portion. The collimator lens 5 converts the incident light beam into a collimated light beam. The reference lens 6A has an anti-reflection coating applied to each of the lens surfaces of its lens components except for a reference spherical surface F. The reference lens 6A converges the incident light beam toward the focal point P. A subject spherical surface 7, which is the subject for the measurement, is arranged at a specified position so that its center of curvature coincides with the focal point P. Furthermore, in the example of FIG. 1, the subject spherical surface 7 is a convex spherical surface.

The reference spherical surface F is the surface of the reference lens 6A that is nearest the subject spherical surface 7. The center of curvature of the reference spherical surface F coincides with the focal point P. The light that has been reflected from the reference spherical surface F and the light that has been reflected by the subject spherical surface 7 back through the reference lens and through the partially reflecting mirror 4 is converged by the imaging lens 8 so as to create light interference fringes on the image sensor 9. The image sensor 9 detects the interference fringes and converts the detected light signals into image data that can be output, for example, to create a picture of the interference fringes at the image sensor 9.

The operation of the Fizeau interferometer 1 of FIG. 1 in measuring the accuracy of the surface shape of the subject spherical surface 7 is as follows. First, a laser light beam with a desired wavelength is emitted from the laser light source 2. The light beam diameter of the light beam from this laser light source is enlarged by the laser light beam radiation lens 3. A portion of the enlarged laser light beam is reflected by the partially reflecting mirror 4 along the optical axis Z1. The reflected laser light beam enters into the collimator lens 5, slightly widens in diameter as it passes through the collimator lens 5, and is converted to a collimated laser light beam that is output from the collimator lens 5. The output light beam then enters into the reference lens 6A and is transmitted to the reference spherical surface F, with each light ray being incident normal to the surface of the reference spherical surface F. Most of the incident light beam is transmitted. However, a small portion of the light beam striking the reference spherical surface F is reflected because no anti-reflection coating has been applied to the reference spherical surface F. Therefore, a portion of the incident light beam is reflected by the reference spherical surface F. The reflected light beam becomes the reference light. On the other hand, the light beam that is transmitted through the reference spherical surface F is converged toward the focal point P. In the example of FIG. 1, because the subject spherical surface 7 is situated between the reference spherical surface F and the focal point P, the transmitted light beam is reflected normally from the subject spherical surface 7 so as to become the subject light. However, if the subject spherical surface 7 were to be a concave surface, the light beam emitted from the reference spherical surface F would actually converge at the focal point P, diverge past the focal point P, and irradiate the subject concave spherical surface in a region beyond the focal point P so as to create the subject light.

The path that the reference light and the subject light travel retraces the route of the incident light, but in the opposite direction. This path passes through the reference lens 6A, through the collimator lens 5, and through the partially reflecting mirror 4 to the imaging lens 8, in that order. The subject light and the reference light are converged by the imaging lens 8 to form interference fringes on the image sensor 9 that may be observed or analyzed in order to indicate the shape of the subject spherical surface 7.

As shown in FIG. 1, a negative meniscus lens component is at the collimator lens side of the reference lens 6A. Reference lens 6A includes a negative meniscus lens component on the collimator lens side. The negative meniscus lens component enlarges the diameter of the light beam and corrects aberrations based on the concave surface of the negative meniscus lens component being on the collimator lens side. This assures a reference lens 6A with a small F-number that provides a bright light beam through the reference lens. Also, the negative meniscus lens component creates a contribution to the correction of spherical aberration of the reference lens 6A that is equal in magnitude, but of opposite sign, to the spherical aberration created by the other lens components of the reference lens 6A. Thus, it cancels out the spherical aberration created by the other lens components.

Preferably, the negative meniscus lens component at the collimator lens side of the reference lens satisfies the following condition:

$$-1.5 < R1/f < -1.2 \quad \text{Condition (1)}$$

where

R1 is the radius of curvature of the concave lens surface of the negative meniscus lens component at the collimator lens side of the reference lens; and f is the focal length of the reference lens.

When Condition (1) is satisfied, the functions of enlargement of the light beam and aberration correction are properly balanced. If the above ratio is less than the lower limit of Condition (1), the light beam incident on the reference lens will be so quickly diverged that an increase in the diameter of the reference lens will be required and the contribution to spherical aberration of the reference lens by the negative meniscus lens component at the collimator lens side of the reference lens will be too large, requiring more lenses to be used in the reference lens in order to cancel that contribution to the spherical aberration of the reference lens, in turn making the reference lens undesirably heavier and less compact. On the other hand, if the above ratio exceeds the upper limit of Condition (1), the diameter of the light beam is not adequately increased and the contribution to the spherical aberration of the reference lens by the negative meniscus lens component on the collimator lens side will be too small.

At the opposite end of the reference lens 6A from the negative meniscus lens component there is a positive meniscus lens component having a reference spherical surface F as its concave surface that faces and is adjacent to the subject spherical surface 7. Between the negative meniscus lens component and the positive meniscus lens component are positive lenses that define a positive lens group that functions to reduce the diameter of the light beam and to increase the collection angle of the light beam by converging the light beam.

The positive meniscus lens component, which has the reference spherical surface F as its concave lens surface that faces and is adjacent to the subject spherical surface 7, functions to form a spherical light wave having a focal point P, and the concave spherical lens surface of the positive meniscus lens component has its center of curvature at the focal point P. The spherical light wave emitted from the concave lens surface converges toward the focal point P, and strikes the subject spherical surface 7 with its direction of propagation at each point being normal to the subject spherical surface 7. Therefore, if the subject spherical surface 7 is convex, the radius of curvature RL of the reference spherical surface F prescribes the maximum radius of curvature of a subject convex spherical surface that can be measured. If the subject spherical surface 7 is a concave spherical surface, there is no restriction on the radius of curvature of the subject spherical surface.

Preferably, the positive meniscus lens component having a reference spherical surface F as its concave surface satisfies the following condition:

$$0.5 < RL/f < 0.7 \quad \text{Condition (2)}$$

where

RL is the radius of curvature of the concave surface of the positive meniscus lens component nearest the focal point of the reference lens; and f is the focal length of the reference lens.

If the above ratio is less than the lower limit of Condition (2), the measurable maximum radius of curvature of a convex subject spherical surface is limited by the relatively low value of RL associated with the above ratio being less than the lower limit of Condition (2). In other words, it becomes impossible to measure a convex spherical surface that has a comparatively large radius of curvature. On the other hand, if the above ratio exceeds the upper limit of Condition (2), the following problems occur. First, the diameter and the total lens length of the reference lens 6A will both increase, and the goals of the reference lens being lightweight and small cannot be realized. Further, because the positive lens group between the negative and positive outer lens components of the reference lens 6A includes so few lens elements (four as shown in FIG. 1), the refractive power of the positive meniscus lens component having the reference spherical surface F as its concave surface is insufficient and correction of spherical aberration becomes difficult. Additionally, the positive meniscus lens component having the reference spherical surface F as its concave surface tends to be thinner when the ratio of Condition (2) exceeds the upper limit of Condition (2), which means that the reference spherical surface F will be easily distorted by external forces, thus making it difficult to precisely measure the shape of the subject spherical surface 7.

The reference lens of the present invention may be constructed with lens elements that have a refractive index less than 1.79.

Spherical aberrations occur at each lens component of the positive lens group and the positive meniscus lens component having the reference spherical surface F as its concave surface. However, these spherical aberrations, as mentioned above, are canceled and/or largely offset by spherical aberration of opposite sign generated by the negative meniscus lens component at the collimator lens side of reference lens 6A. As a result, the spherical aberration of the reference lens is extremely small.

Figure 2:
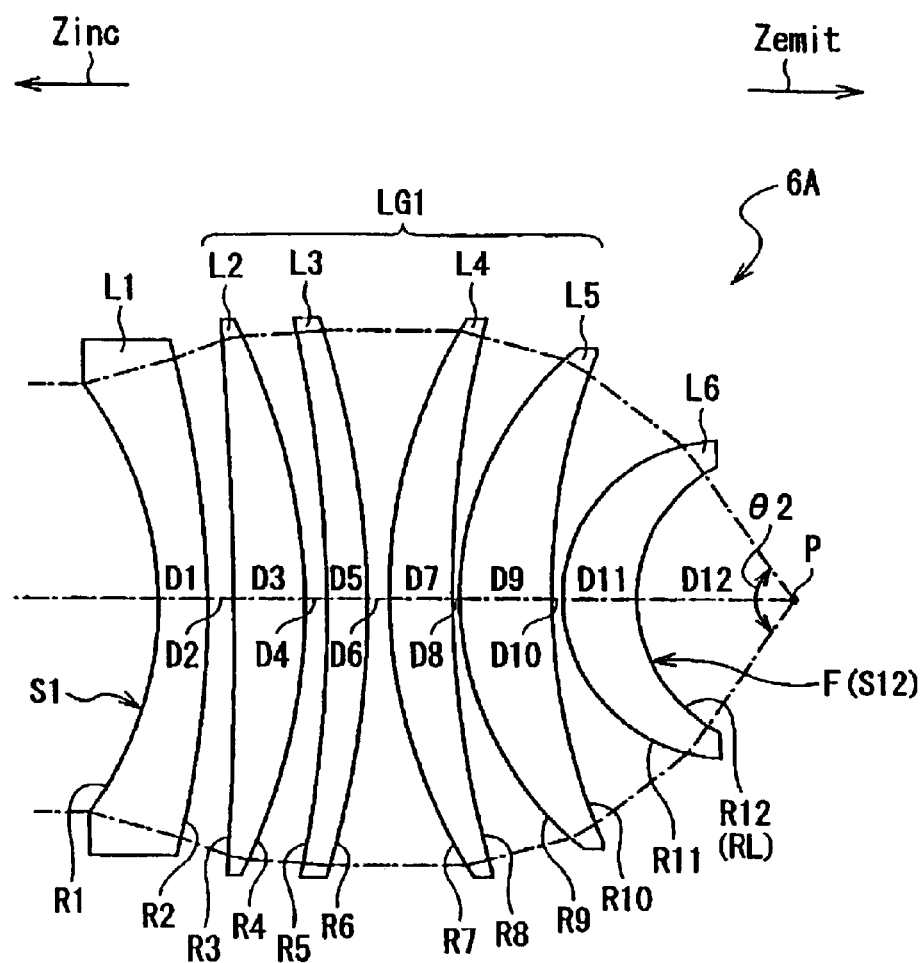
FIG. 2 is an enlarged cross-sectional view of the reference lens shown in FIG. 1.
Figure 3:
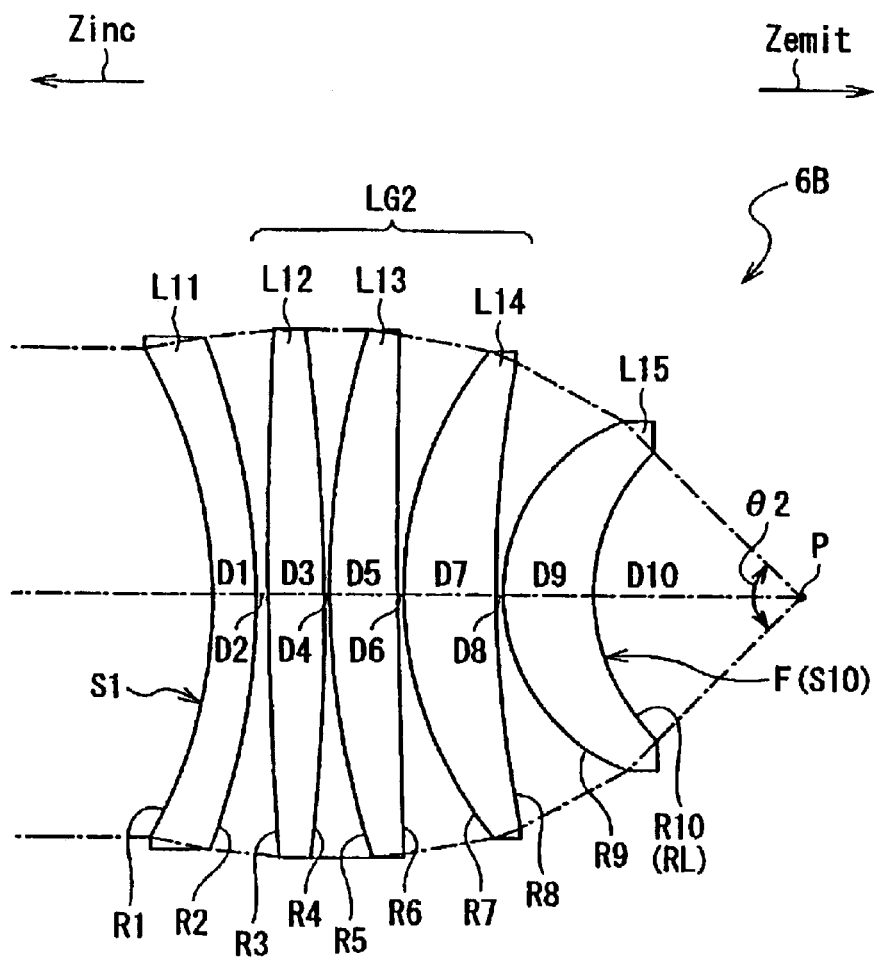
FIG. 3 shows a cross-sectional view of a reference lens according to Embodiment 2 of the present invention.

Three embodiments of the present invention will now be individually described with reference to the drawings. In all three embodiments, as shown in FIGS. 2 and 3, lens elements, which are also lens components, are referenced by the letter L followed by a number denoting the sequential order from the collimator lens 5 of the Fizeau interferometer, from L1 to L6 in FIG. 2 and from L11 to L15 in FIG. 3. Similarly, the radii of curvature of all the refractive lens surfaces are referenced by the letter R followed by a number denoting the sequential order from the collimator lens 5, from R1 to R12 in FIG. 2 and from R1 to R10 in FIG. 3. The on-axis surface spacings (along the optical axis of the figures) of all the optical surfaces, including the distance to the focal point P, are referenced by the letter D followed by a number denoting the sequential order from the collimator lens 5, from D1 to D12 in FIG. 2 and from D1 to D10 in FIG. 3. The collimator lens 5 side of reference lens 6A is indicated by the notation Zinc and a directional arrow at the top of FIGS. 2 and 3, and the focal point side of reference lens 6A is similarly indicated by the notation Zemit and a directional arrow at the other side of the top of FIGS. 2 and 3. In both FIGS. 2 and 3, the collection angle of the reference lens illustrated is indicated by the included angle θ2.

Embodiment 1

FIG. 2 shows the basic lens element configuration and lens group positions of Embodiment 1 of the reference lens of the present invention. As shown in FIG. 2, a collimated light beam enters the reference lens 6A through concave lens surface S1 of a negative meniscus lens component L1 and begins diverging. Lens surface S1 has a radius of curvature R1 that satisfies Condition (1) above. Positive lens group LG1, that includes positive lens components L2, L3, L4, and L5 (as indicated by the upper bracket beneath LG1 in FIG. 2), functions to reduce the diameter of the light beam and to increase the collection angle of the light beam by converging the light beam toward the positive meniscus lens component L6. In this case the reference spherical surface F is positioned at concave lens surface S12 having a radius of curvature R12 (denoted at RL to indicate that it is the lens surface that satisfies Condition (2) above). The converging light beam converges within a collection angle θ to the focal point P, as shown in FIG. 2.

Preferably, the lens surfaces of lens components L2 and L3 that are on the focal point side of each of those lens components have greater curvatures than the other lens surface of each of those lens components. In contrast, preferably each of the lens surfaces of lens components L4 and L5 that is on the focal point side of each of those lens components has a lesser curvature than the other lens surface of each of those lens components. As shown in FIG. 2, all of the lens components of the positive lens group LG1 have a meniscus shape. However, alternatively, the positive lens group LG1 may include biconvex lens components.

Embodiment 1 is designed so that the F-number of the reference lens 6A is 0.60 and uses an incident collimated light beam having a diameter of 100 mm. All the lens elements of Embodiment 1 have a refractive index of 1.77861 at a wavelength 632.8 nm, which is the wavelength of a He-Ne laser beam with which the reference lens may be used.

Table 1 below lists the surface number #, in order from the object side, the radius of curvature R (in mm) of each lens surface, the on-axis lens surface spacing D (in mm), and the diameter K of each lens surface (in mm) of each lens component of the reference lens of Embodiment 1. Listed in the middle portion of Table 1 are the focal length f (in mm) of the reference lens, and the total lens length TL (on axis, in mm) of the reference lens. Furthermore, listed in the bottom portion of the Table 1 are the values corresponding to Conditions (1) and (2) for Embodiment 1.

TABLE 1

| # | R | D | K |
|---|---|---|---|
| 1 | −86.207 | 11.00 | 106.0 |
| 2 | −270.280 | 6.50 | 120.0 |
| 3 | −1040.100 | 15.500 | 130.0 |
| 4 | −154.410 | 5.500 | 130.0 |
| 5 | −293.920 | 9.400 | 130.0 |
| 6 | −205.750 | 4.750 | 130.0 |
| 7 | 121.350 | 15.000 | 130.0 |
| 8 | 249.550 | 1.500 | 128.0 |
| 9 | 74.513 | 21.000 | 116.0 |
| 10 | 146.800 | 2.500 | 114.0 |
| 11 | 37.453 | 16.820 | 74.0 |
| 12 | 36.429 | 36.429 | 64.0 | f = 59.990  TL = 109.470
Condition (1) value: Rl/f = −1.437
Condition (2) value: RL/f = 0.607

As Table 1 shows, both Conditions (1) and (2) are satisfied by Embodiment 1.

Figure 4:
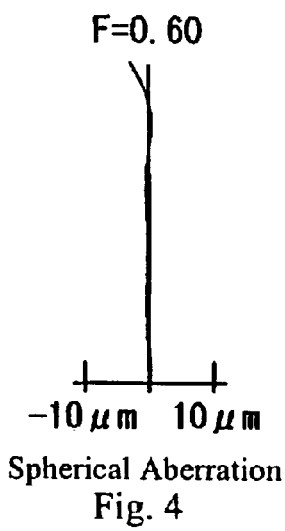
FIG. 4 shows the spherical aberration of Embodiment 1 of the reference lens of the present invention.

FIG. 4 shows the spherical aberration of the reference lens of Embodiment 1 measured at a wavelength of 632.8 nm. As shown in FIG. 4, the spherical aberration of the reference lens of Embodiment 1 is very well corrected. Additionally, even though the maximum diameter of a lens component in Embodiment 1 is only 130.0 mm, Embodiment 1 achieves a radius of curvature of the reference spherical surface of 36.429 mm and a collection angle of 112.89°, that corresponds to an F-number of 0.60 and a numerical aperture of approximately 0.833. Therefore, when the subject spherical surface has an acceptance angle of about 112° or less and a radius of curvature of about 36 mm or less, even if it is a convex subject spherical surface, the subject spherical surface is still measurable using the reference lens of Embodiment 1.

Embodiment 2

FIG. 3 shows the basic lens element configuration and lens group positions of the reference lens of Embodiment 2. Embodiment 2 is similar to Embodiment 1, but Embodiment 2 includes only three lens components in the positive lens group between the outer negative and positive meniscus lens components of the reference lens 6B. Because Embodiment 2 is similar to Embodiment 1, only the primary differences between Embodiment 2 and Embodiment 1 will be explained for Embodiment 2. As shown in FIG. 3, a collimated light beam enters the reference lens 6B through a concave lens surface S1 of negative meniscus lens component L11 and begins diverging. Lens surface S1 has a radius of curvature R1 that satisfies Condition (1) above. Positive lens group LG2, that includes positive lens components L12, L13, and L14 (as indicated by the upper bracket beneath LG2 in FIG. 3), functions to reduce the diameter of the light beam and to increase the collection angle of the light beam by converging the light beam toward the positive meniscus lens component L15 having the reference spherical surface F as its concave lens surface S10 and with a radius of curvature R10 that is also denoted as RL in order to indicate that it is the lens surface that satisfies Condition (2) above.

The converging light beam converges within a collection angle θ2 to the focal point P, as shown in FIG. 3.

Preferably, the lens surface of lens component L12 that is on the focal point side has greater curvature than the other lens surface of lens component L12. In contrast, preferably each of the lens surfaces of lens components L13 and L14 that is on the focal point side of each of those lens components has a lesser curvature than the other lens surface of each of those lens components. As shown in FIG. 3, lens component L12 is a biconvex lens and lens components L13 and L14 have meniscus shapes. However, other arrangements are possible. For example, lens components L12 and L14 may each have a meniscus shape and lens component L13 may be biconvex. Also, all three lenses, L12, L13, and L14, of lens group LG2 maybe meniscus lens components.

The reference lens of Embodiment 2, just as the reference lens of Embodiment 1, is designed for use in an interferometer, and in particular, in a Fizeau interferometer as discussed generally with regard to FIG. 1 above. The three lens component construction of Embodiment 2 enables an even lighter and more compact reference lens than that of Embodiment 1. Embodiment 2 is designed so that the F-number of the reference lens 6B is 0.70 and uses an incident collimated light beam having a diameter of 100 mm. All the lens elements of Embodiment 2 have a refractive index of 1.61655 at a wavelength 632.8 nm, which is the wavelength of a He—Ne laser beam with which the reference lens may be used.

Table 2 below lists the surface number #, in order from the object side, the radius of curvature R (in mm) of each lens surface, the on-axis lens surface spacing D (in mm), and the diameter K of each lens surface (in mm) of each lens component of the reference lens of Embodiment 2. Listed in the middle portion of Table 2 are the focal length f (in mm) of the reference lens, and the total lens length TL (on axis, in mm) of the reference lens. Furthermore, listed in the bottom portion of the Table 2 are the values corresponding to Conditions (1) and (2) for Embodiment 2.

TABLE 2

| # | R | D | K |
|---|---|---|---|
| 1 | −102.203 | 8.583 | 106.0 |
| 2 | −148.312 | 2.500 | 113.0 |
| 3 | 843.933 | 11.333 | 113.0 |
| 4 | −438.933 | 1.133 | 113.0 |
| 5 | 182.767 | 13.667 | 113.0 |
| 6 | 1902.500 | 1.183 | 113.0 |
| 7 | 79.573 | 18.417 | 105.0 |
| 8 | 249.833 | 1.550 | 105.0 |
| 9 | 38.410 | 18.500 | 74.0 |
| 10 | 41.668 | 41.668 | 61.5 | f = 69.989  TL = 76.867
Condition (1) value: Rl/f = −1.460
Condition (2) value: RL/f = 0.595

As Table 2 shows, both Conditions (1) and (2) are satisfied by Embodiment 2.

Figure 5:
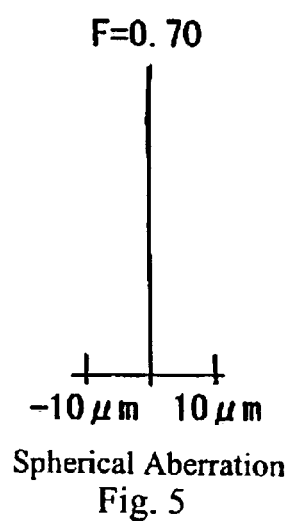
FIG. 5 shows the spherical aberration of Embodiment 2 of the reference lens of the present invention.

FIG. 5 shows the spherical aberration of the reference lens of Embodiment 2 measured at a wavelength of 632.8 nm. As shown in FIG. 5, the spherical aberration of the reference lens of Embodiment 2 is very well corrected. Additionally, even though the maximum diameter of a lens component in Embodiment 2 is only 113.0 mm, Embodiment 2 achieves a radius of curvature of the reference spherical surface of 41.668 mm and a collection angle of 91.17°, that corresponds to an F-number of 0.70 and a numerical aperture of approximately 0.714. Therefore, when the subject spherical surface has an acceptance angle of about 90° or less and a radius of curvature of about 41 mm or less, even if it is a convex subject spherical surface, the subject spherical surface is still measurable using the reference lens of Embodiment 2.

Embodiment 3

FIG. 3 also shows the basic lens element configuration and lens group positions of the reference lens of Embodiment 3. Embodiment 3 is similar to Embodiment 1, but is even more similar to Embodiment 2. Because Embodiment 3 is so similar to Embodiment 2, only the primary differences between Embodiment 3 and Embodiment 2 will be discussed for Embodiment 3. The basic lens element configuration of Embodiment 3 differs from Embodiment 2 only in the configuration of lens component L15 and its position along the optical axis.

As in Embodiment 2, Embodiment 3 is designed so that the F-number of the reference lens 6B is 0.70. Once again the incident collimated light beam has a diameter of 100 mm. Also as in Embodiment 2, all the lens elements of Embodiment 3 have a refractive index of 1.61655 at a wavelength 632.8 nm, which is the wavelength of a He-Ne laser beam with which the reference lens may be used, including the lens element L15.

Table 3 below lists the surface number #, in order from the object side, the radius of curvature R (in mm) of each lens surface, the on-axis lens surface spacing D (in mm), and the diameter K of each lens surface (in mm) of each lens component of the reference lens of Embodiment 3. Listed in the middle portion of Table 3 are the focal length f (in mm) of the reference lens, and the total lens length TL (on axis, in mm) of the reference lens. Furthermore, listed in the bottom portion of the Table 3 are the values corresponding to Conditions (1) and (2) for Embodiment 3.

TABLE 3

| # | R | D | K |
|---|---|---|---|
| 1 | −102.203 | 8.583 | 106.0 |
| 2 | −148.312 | 2.500 | 113.0 |
| 3 | 843.933 | 11.333 | 113.0 |
| 4 | −438.933 | 1.133 | 113.0 |
| 5 | 182.767 | 13.667 | 113.0 |
| 6 | 1902.500 | 1.183 | 113.0 |
| 7 | 79.573 | 18.417 | 105.0 |
| 8 | 249.833 | 1.550 | 105.0 |
| 9 | 38.410 | 21.840 | 74.0 |
| 10 | 38.328 | 38.328 | 56.5 | f = 69.989  TL = 80.207
Condition (1) value: Rl/f = −1.460
Condition (2) value: RL/f = 0.548

As Table 3 shows, both Conditions (1) and (2) are satisfied by Embodiment 3.

Figure 6:
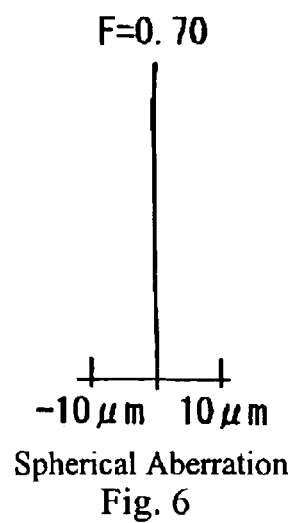
FIG. 6 shows the spherical aberration of Embodiment 3 of the reference lens of the present invention.

FIG. 6 shows the spherical aberration of the reference lens of Embodiment 3 measured at a wavelength of 632.8 nm. As shown in FIG. 6, the spherical aberration of the reference lens of Embodiment 3 is very well corrected. Additionally, even though the maximum diameter of a lens component in Embodiment 3 is only 113.0 mm, Embodiment 3 achieves a radius of curvature of the reference spherical surface of 38.328 mm and a collection angle of 91.17°, that corresponds to an F-number of 0.70 and a numerical aperture of approximately 0.714. Therefore, when the subject spherical surface has an acceptance angle of about 90° or less and a radius of curvature of about 38 mm or less, even if it is a convex subject spherical surface, the subject spherical surface is still measurable using the reference lens of Embodiment 3.

The present invention is not limited to the aforementioned embodiments, as it will be obvious that various alternative implementations are possible. For instance, values such as the radius of curvature R of each of the lens components, the surface spacings D, the refractive index N, as well as the diameter K of each lens surface of each lens component of the reference lens are not limited to the examples indicated in each of the aforementioned embodiments, as other values can be adopted. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A reference lens for an interferometer, the reference lens being constructed so that light that is transmitted by a partially reflecting reference spherical surface of the reference lens may first be converged toward a focal point that coincides with the center of curvature of the partially reflecting reference spherical surface and then reflected from a subject spherical surface that also has its center of curvature at said focal point, so that light reflected from the subject spherical surface is transmitted back through the partially reflecting reference spherical surface and interferes with light that is initially reflected by the partially reflecting reference spherical surface, thereby enabling measurement of the shape of the subject spherical surface, said reference lens comprising, a negative meniscus lens component at a first side of the reference lens, a positive lens group, and a positive meniscus lens component at a second side of the reference lens nearest where the focal point is located; wherein the concave lens surface of said negative meniscus lens component is at said first side;

the concave lens surface of said positive meniscus lens component is at said second side; and the following Conditions (1) and (2) are satisfied:

$$-1.5 < R1/f < -1.2 \quad \text{Condition (1)}$$

$$0.5 < RL/f < 0.7 \quad \text{Condition (2)}$$

where

R1 is the radius of curvature of said concave lens surface of said negative meniscus lens component;

f is the focal length of the reference lens, and

RL is the radius of curvature of said concave lens surface of said positive meniscus lens component.

2. The reference lens of claim 1, wherein said positive lens group comprises three lens components.

3. The reference lens of claim 1, wherein said positive lens group consists of three lens components.

4. The reference lens of claim 1, wherein the reference lens consists of five lens elements.

5. The reference lens of claim 1, wherein said positive lens group consists of three lens elements.

6. The reference lens of claim 1, wherein said positive lens group comprises four lens components.

7. The reference lens of claim 1, wherein said positive lens group consists of four lens components.

8. The reference lens of claim 1, wherein the reference lens consists of six lens elements.

9. The reference lens of claim 1, wherein said positive lens group consists of four lens elements.

10. The reference lens of claim 1, wherein said positive lens group includes, in order from said negative meniscus lens component toward said positive meniscus lens component, a positive lens component with its lens surface of greater curvature on the focal point side and two positive lens components, each with its lens surface of lesser curvature on the focal point side.

11. The reference lens of claim 10, wherein said positive lens group consists of three lens components.

12. The reference lens of claim 10, wherein said reference lens consists of five lens elements.

13. The reference lens of claim 10, wherein said positive lens group consists of three lens elements.

14. The reference lens of claim 1, wherein said positive lens group includes, in order from said negative meniscus lens component toward-said positive meniscus lens component, two positive lens components, each with its lens surface of greater curvature on the focal point side, and two positive lens components, each with its lens surfaces of lesser curvature on the focal point side.

15. The reference lens of claim 14, wherein said positive lens group consists of four lens components.

16. The reference lens of claim 14, wherein said reference lens consists of six lens elements.

17. The reference lens of claim 14, wherein said positive lens group consists of four lens elements.

18. The reference lens of claim 1, wherein said negative meniscus lens and said positive meniscus lens each consist of a single lens element.

19. The reference lens of claim 1 in combination with an interferometer.

20. The reference lens of claim 1 in combination with a Fizeau interferometer.

* * * * *